(12) United States Patent
Lee (10) Patent No.: US 10,371,567 B2
(45) Date of Patent: Aug. 6, 2019

(54) INTELLIGENT NOISE MONITORING DEVICE AND NOISE MONITORING METHOD USING THE SAME

(71) Applicant: DOOSAN HEAVY INDUSTRIES & CONSTRUCTION CO., LTD., Changwon-si, Gyeongsangnam-do (KR)

(72) Inventor: Sang Jin Lee, Daegu (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 0 days.

(21) Appl. No.: 14/805,730

(22) Filed: Jul. 22, 2015

(65) Prior Publication Data

US 2016/0025551 A1    Jan. 28, 2016

(30) Foreign Application Priority Data

Jul. 28, 2014  (KR) .......................... 10-2014-0095871

(51) Int. Cl.
   *G01H 3/04*   (2006.01)
   *G08G 5/00*   (2006.01)
   (Continued)

(52) U.S. Cl.
   CPC ............. *G01H 3/04* (2013.01); *G01H 3/00* (2013.01); *G01H 3/10* (2013.01); *G08G 5/003* (2013.01);
   (Continued)

(58) Field of Classification Search
   CPC .. G01H 3/04; G01H 3/00; G01H 3/10; G05D 1/0094; G05D 1/12; G08G 5/003; B64C 2201/123; B64C 2201/027
   See application file for complete search history.

(56) References Cited

U.S. PATENT DOCUMENTS 8,775,013 B1 * 7/2014 Smailus ................ B64F 5/60
                                             244/190
9,087,451 B1 * 7/2015 Jarrell ................. G08G 5/0069
                       (Continued)

FOREIGN PATENT DOCUMENTS

EP    1995560 A2    11/2008
GB    2309301 A     7/1997
                       (Continued)

OTHER PUBLICATIONS

Sumiya Hiroyuki et al. [Sumiya], Transmission Line Inspection System Using Unpiloted Plane and Method Using It, Sep. 29, 2005, (JP 2005265710 A) (English Machine Translation Used), pp. 1-14.*
(Continued)

*Primary Examiner* — Jelani A Smith
*Assistant Examiner* — Majdi Alsomiri
(74) *Attorney, Agent, or Firm* — Invenstone Patent, LLC (57) ABSTRACT

An intelligent noise monitoring device includes a self-flying moving module, a noise measurement module equipped in the moving module to measure noise of a target to be detected, a control module configured to control the moving module and the noise measurement module; and a communication module configured to communicate with a ground control center, wherein the intelligent noise monitoring device flies to a location to be detected to measure the noise of the location to be detected so as to determine whether or not the measured noise is in an abnormal state.

17 Claims, 5 Drawing Sheets

(51) Int. Cl.
  *G01H 3/10* (2006.01)
  *G05D 1/12* (2006.01)
  *G01H 3/00* (2006.01)
(52) U.S. Cl.
  CPC .. *B64C 2201/027* (2013.01); *B64C 2201/123* (2013.01)

(56) References Cited

U.S. PATENT DOCUMENTS

| | | | | | |
|---|---|---|---|---|---|
| 2003/0067542 | A1* | 4/2003 | Monroe | ............ | H04N 7/181 348/148 |
| 2004/0066940 | A1* | 4/2004 | Amir | ............ | G10K 11/1784 381/94.2 |
| 2005/0271221 | A1* | 12/2005 | Cerwin | ............ | H04R 1/406 381/92 |
| 2010/0017114 | A1* | 1/2010 | Tehan | ............ | G05D 1/0646 701/423 |
| 2014/0166816 | A1* | 6/2014 | Levien | ............ | B64C 39/024 244/175 |
| 2016/0063987 | A1* | 3/2016 | Xu | ............ | B64C 39/024 381/71.12 |
| 2016/0116914 | A1* | 4/2016 | Mucci | ............ | G05D 1/101 701/2 |

FOREIGN PATENT DOCUMENTS

| | | |
|---|---|---|
| JP | 2005265710 A | 9/2005 |
| KR | 1020100052437 A | 5/2010 |
| KR | 1020130067847 A | 6/2013 |
| KR | 101363066 B1 | 2/2014 |

OTHER PUBLICATIONS

Korean Office Action in corresponding Korean Application No. 10-2014-0095871 dated Sep. 30, 2015.
European Office Action in connection with counterpart EP application No. 15176638.3 dated Jan. 26, 2016.
Klapel, Acoustic Measurements with a Quadcopter, Embedded Computing Systems, Norwegian University of Science and Technology Department of Electronics and Telecommunications, Jun. 2014, pp. 1-123.
Bree et al, Acoustic Vector Sensors on Small Unmanned Air Vehicles, Microflown AVISA, the Netherlands, Micro Air Vehicle Laboratory, Delft University of Technology, the Netherlands Presented at the SMi Unmanned Aircraft Systems, UK, Nov. 2011, pp. 1-8.
Nash, In the Fog of Battle Acoustic Sensors Pinpoint Gunfire by Measuring Air Movement, Scientific American, A Division of Nature America Inc., Apr. 30, 2013, pp. 1-6.

* cited by examiner

INTELLIGENT NOISE MONITORING DEVICE AND NOISE MONITORING METHOD USING THE SAME

CROSS-REFERENCE TO RELATED APPLICATION

This application claims priority to Korean Patent Application No. 10-2014-0095871, filed on Jul. 28, 2014, the disclosure of which is incorporated herein by reference in its entirety.

BACKGROUND

Field

Exemplary embodiments of the present invention relate to an intelligent noise monitoring device and a noise monitoring method using the same, and more particularly, to an intelligent noise monitoring device and a noise monitoring method using the same capable of measuring noise of a targeted location in real time and comparing and analyzing the measured noise with a reference value to determine abnormal noise for itself.

Description of the Related Art

Generally, noise and vibration are generated in a factory, a construction site, a road, a railroad, vehicles, and the like. Therefore, an allowable exhaust standard for noise and vibration is defined to prevent damages which may occur due to the noise and vibration which occur above a threshold level.

A regulation standard of living noise is different depending on a usage of locations such as a residential district, a commercial district, a semi-industrial district, a general industrial district, and a location other than a residence in a settlement district.

Facilities of factories, and the like which are positioned in the semi-industrial district or the general industrial district should be managed to keep the occurrence of noise and vibration below the defined regulation standard. Until now, an operator carries a noise meter one by one to measure noise and wanders a targeted location to measure noise or as disclosed in Korean Patent Laid-Open Publication No. 2012-0082304, noise is measured by a noise meter which is fixedly installed in a specific place.

However, the facilities of factories are constructed on various scales from a small size to a large size and are provided with various machines which act as a generation source of noise. The machines do not always generate the same level of noise but may generate a small level of noise and a large level of noise in response to surrounding environment, an operation state, or the like and may generate an abnormally large level of noise.

However, the fixedly installed noise meter or the noise meter carried by the operator may not immediately cope with the occurrence of abnormal noise and have difficulty of monitoring noise in real time.

RELATED ART DOCUMENT

Patent Document

Korean Patent Laid-Open Publication No. 2012-0082304 (Published on Jul. 23, 2012)

SUMMARY

An object of the present invention relates to provide an intelligent noise monitoring device and a noise monitoring method using the same capable of flying around a broad area to automatically measure noise of a location to be measured in real time and compare and analyze the measured noise with a reference value so as to determine abnormal noise for itself.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

An intelligent noise monitoring device includes: a self-movable moving module; a noise measurement module configured to be equipped in the moving module to measure noise of a location to be detected or a target to be detected which is positioned within the location to be detected; a control module configured to control the moving module and the noise measurement module; and a communication module configured to communicate with a ground control center, wherein the control module determines a noise reference by measuring the noise of the location to be detected or the target to be detected for a set time or a set period and compares the noise measured from the location to be detected or the target to be detected with the noise reference to determine an abnormal state or not.

The moving module may include a self-flying unmanned aerial means and the noise measurement module may include an acoustic camera.

The control module may include: a path controller configured to control a path of the moving module; a noise measurement controller configured to control the noise measurement module; an operation controller configured to analyze noise measured by the noise measurement module to determine the abnormal state or not; a recharge controller configured to control recharge and power of the moving module; and a setting controller configured to manage preset data and update data received from the ground control center.

The control module may store map information of the location to be detected, positional information within the location to be detected which is mapped to the map information, and a set path along which the moving module moves and when the map information and the set path are changed, may store and update the changed map information and set path.

The control module may store a changed path when the set path is changed for any one of avoidance of obstacles on the path, emergency recharging, and noise measurement of a border of the location to be detected and compare the changed path with the set path to control a return to the set path.

The noise measurement controller may operate the noise measurement module when entering the location to be detected and stop the noise measurement module at the time of deviating from the location to be detected after the noise measurement operation is completed.

The operation controller may compare the noise measured by the noise measurement module with a noise reference in the normal noise state which is pre-stored to determine whether the noise is normal noise or abnormal noise and if it is determined that the noise is the abnormal noise, transmit information on the target to be detected to the ground control center through the communication module.

The operation controller may transmit a signal to the noise measurement controller if it is determined that the noise is the abnormal noise to re-measure the noise of the location to be detected or the target to be detected at each distance.

The recharge controller may check a state of charge or a charging timing of the moving module and control the moving module to move to a recharge station depending the state of charge or the charging timing.

The setting controller may communicate with the ground control center through the communication module to determine whether there is the update data including any one of whether to change the map information, whether to update the preset data, and whether to change the set path so as to receive the update data and reflect the received update data to the preset data.

The communication module may include a GPS receiving module, discriminate GPS coordinates within the location to be detected by the GPS receiving module and map the discriminated GPS coordinates to the map information, and transmit the mapped information to the path controller.

The noise and the noise reference may include a form of any one of a decibel (dB), a frequency, and a noise pattern.

A noise monitoring method using an intelligent noise monitoring device of the present invention includes: a path entering step of allowing, by a driving of a moving module self-moving along a set path stored in a control module controlling the moving module and a noise measurement module, a noise monitoring device to enter a location to be detected; a running step of measuring, by the noise measurement module equipped in the moving module, noise of the location to be detected or a target to be detected while running along the set path; a determining step of comparing, by the control module, a noise reference in a normal noise state which is created by measuring the noise of the location to be detected or the target to be detected for a set time or a set period with the measured noise; and a running keeping step of controlling a movement of the noise monitoring device if it is determined in the determining step by the control module that the noise is the normal noise.

The noise monitoring method may further include: if it is determined in the determining step by the control module that the noise is the abnormal noise, a re-measuring step of re-measuring the noise of the target to be detected at each distance and an abnormal noise determining step of determining whether the noise measured in the re-measuring step is the abnormal noise.

The noise monitoring method may further include: if it is determined in the abnormal noise determining step by the control module that the noise is the abnormal noise, a mapping step of mapping positional information of the noise monitoring device to map information of the location to be detected, after the mapping step, a reporting step of transmitting the noise and the map information which are measured by communicating with the ground control center, and after the reporting step, a running returning step of returning to the set path.

The noise monitoring method may further include: a reporting step of transmitting the noise measured after the running keeping step to the ground control center.

The noise and the noise reference in the normal noise state may include a form of any one of a decibel (dB), a frequency, and a noise pattern.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Hereinafter, an intelligent noise monitoring device and a noise monitoring method using the same according to an exemplary embodiment of the present invention will be described in detail with reference to the accompanying drawings.

Figure 1:
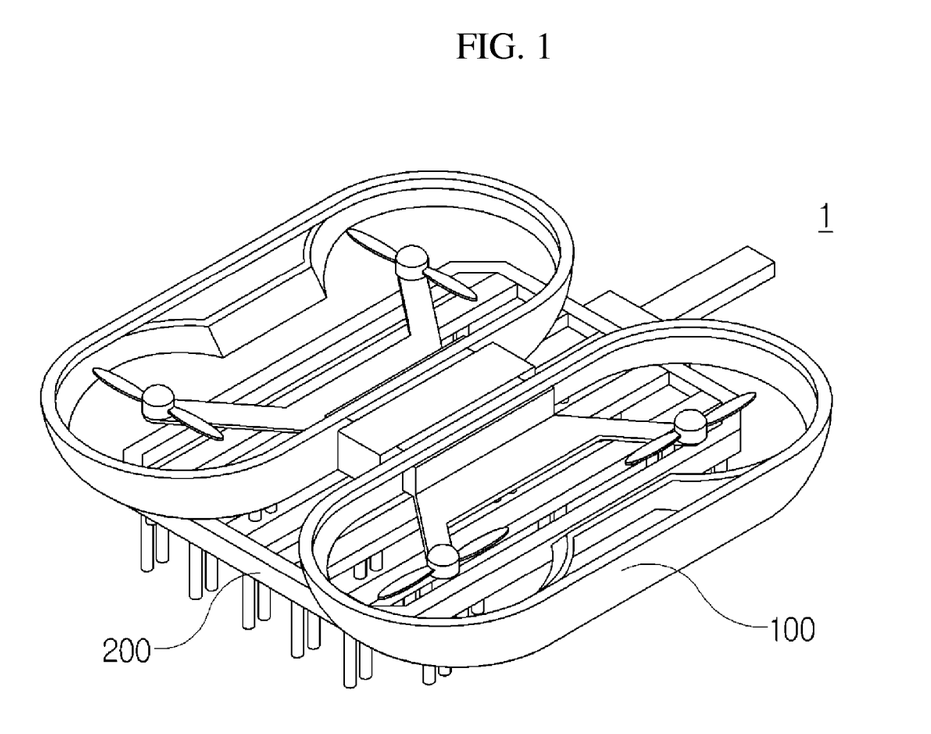
FIG. 1 is a perspective view illustrating an example of an intelligent noise monitoring device according to an exemplary embodiment of the present invention.
Figure 2:
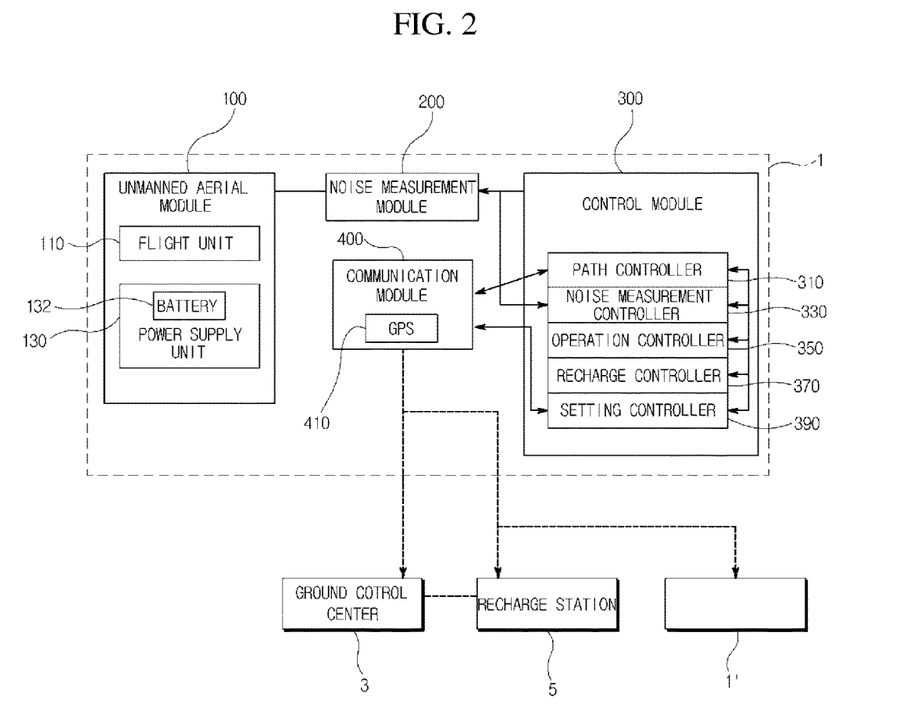
FIG. 2 is a block diagram illustrating a configuration of the intelligent noise monitoring device according to the exemplary embodiment of the present invention.

FIG. 1 is a perspective view illustrating an example of an intelligent noise monitoring device according to an exemplary embodiment of the present invention and FIG. 2 is a block diagram illustrating a configuration of the intelligent noise monitoring device according to the exemplary embodiment of the present invention.

As illustrated in FIGS. 1 and 2, an intelligent noise monitoring device 1 according to an exemplary embodiment of the present invention is configured to include a self-movable moving module 100, a noise measurement module 200 which is equipped in the moving module 100 to measure noise of a target to be measured, a control module 300 controlling the moving module 100 and the noise measurement module 200, and a communication module 400 communicating with a ground control center 3.

The moving module 100 self-moves around a location to be detected in the state in which the mobile module 100 equips the noise measurement module 200, the control module 300, and the communication module 400 and may be implemented as an unmanned aerial means such as a drone (hereinafter, for convenience, the case in which the mobile module is the unmanned aerial means which may perform a self flight will be described as an example). The moving module 100 is configured to include a flight unit 110 which takes charge of substantial flight and a power supply unit 130 in which a battery 132 for providing power the flight unit 110 is equipped. The flight unit 110 is a unit which has a similar shape to a helicopter or an airplane and flies by being supplied with power from the power supply unit 130. The power supply unit 130 interworks with the control module 300 to transmit data on how much a state of recharge remains to the control module 300 in real time.

The noise measurement module 200 is a component for measuring noise from targets within the location to be detected and may include, for example, an acoustic camera. The acoustic camera may be a unidirectional camera which measures only noise in one direction and a semi-spherical or spherical multi-directional acoustic camera which measures noise in several directions (the acoustic camera is a known technology and therefore the detailed description thereof will be omitted). The noise measurement module 200 measures the noise of the targets while flying within the location to be detected and transmits the measured value to the control module 300. When the noise measurement module 200 is implemented as the acoustic camera, a thermal sensing camera covers noise on a photographed image in a color contour to represent a noise level (dB). The so measured noise is analyzed by the control module 300 to determine whether the measured noise is abnormal noise or normal noise.

The control module 300 is configured to include a path controller 310 which sets and controls a flight path of the intelligent noise monitoring device 1, a noise measurement controller 330 which controls the noise measurement module 200, an operation controller 350 which processes the noise measured by the noise measurement module 200, a recharge controller 370 which controls power of the moving module 100, and a setting controller 390 which controls various kinds of set matters.

The path controller 310 stores map information on the location to be detected around which the noise monitoring device 1 will fly. The stored map information is stored with both of the information on the path along which the intelligent noise monitoring device 1 will fly and the position information of the intelligent noise monitoring device 1 within the location to be detected which is acquired by a GPS receiving module 410 to be described below while the path information is mapped with the position information. The path controller 310 controls the intelligent noise monitoring device 1 to run along the stored set path and also controls a change path when the intelligent noise monitoring device 1 deviates from the path. The path controller 310 serves to store the changed path when a path is changed due to presence of obstacles while the intelligent noise monitoring device 1 flies or for the purpose of emergency charging, border noise measurement, and the like and compares the changed path with an initially stored set path to return the intelligent noise monitoring device 1 to the set path.

When the intelligent noise monitoring device 1 does not run along the set path due to the sudden occurrence of obstacles, the path controller 310 compares the set path with positions of obstacles to set and set the changed path to return the intelligent noise monitoring device 1 to return to the set path via the shortest distance. For this purpose, the intelligent noise monitoring device 1 may further include an additional sensing means such as a position sensing sensor and a distance sensing sensor which may sense the occurrence of obstacles.

The path controller 310 may store map information at the time of the initial setting of the intelligent noise monitoring device 1 and may help noise information on a newly added target to be detected and the positional information on the intelligent noise monitoring device 1 at the corresponding position to the map information when no information is present or the map information is changed due to a change in a location to be detected. That is, when the newly added target to be detected is present and no corresponding target is present in the map information, the path controller 310 may inform the ground control center 3 of the presence of the corresponding target and measure noise in connection with the noise measurement controller 330 and transmit the measured noise to the ground control center 3. In this case, the position of the corresponding target may be estimated based on the positional information of the intelligent noise monitoring device 1 corresponding to the location where noise is measured. Alternatively, when the positional information on the newly added target to be detected is measured by the operator in advance, the corresponding information may be transferred to the path controller 310 through the ground control center 3.

Further, when the intelligent noise monitoring device 1 deviates from the set path for the purpose of the emergency recharging, the border noise measurement, and the like, the path controller 310 operates the shortest distance between the set path and the recharge station 5 or the target to be detected of the border to set and store the changed path.

As described above, the changed path for several purposes is stored in the path controller 310 and may be used as a reference when the path change of the same pattern occurs later.

The noise measurement controller 330 may control the noise measurement module 200 and operate the noise measurement module 200 when entering the location to be detected while interworking with the path controller 310 to sense the noise occurrence of the location to be detected in real time. When the noise measurement controller 330 deviates from the location to be detected after all the noise measurement operations are completed, the noise measurement controller 330 stops the operation of the noise measurement module 200. If necessary, when the intelligent noise monitoring device flies around a target which need not to be detected, the noise measurement controller 330 may temporarily stop the operation of the noise measurement module 200 for power saving. Basically, however, the noise measurement controller 330 may control the noise measurement module 200 to be continuously operated within the location to be detected.

Further, the noise measurement controller 330 transmits a signal to the path controller 310 and the moving module 100 for re-measurement when abnormal noise over a reference is sensed within the location to be detected or when abnormal noise is sensed in the target to be detected within the location to be detected. The intelligent noise monitoring device 1 approaches a location or a target where the abnormal noise occurs depending on the signal of the path controller 310 and the operation of the moving module 100 to measures noise once again and the re-measurement operation may be performed plural times if necessary. The re-measured noise is transmitted to the operation controller 350 to determine the abnormal state or not.

The operation controller 350 compares the noise measured by the noise measurement module 200 with the reference to determine whether the measured noise is the abnormal noise or the normal noise (noise corresponding to the reference or less). For this purpose, the operation controller 350 interworks with the map information to store a noise reference corresponding to the normal noise for each target to be detected which is mapped to the map information. The noise and the reference may be measured and compared in a decibel (dB) unit or a frequency unit. In this case, when noise occurs above a reference decibel or noise of a frequency other than a frequency stored in each target to be detected occurs, the noise may be diagnosed as the abnormal noise. Alternatively, when noise having a specific pattern which constantly occurs for each target to be detected is the normal noise, it may be determined whether the noise is the normal noise or the abnormal noise depending on whether the noise deviates from the corresponding noise pattern. If it is determined that the noise is the normal noise, the intelligent noise monitoring device 1 moves to the subsequent target to be detected and if it is determined that the noise is the abnormal noise, the intelligent noise monitoring device 1 more approaches a noise generation source to re-measure noise and a re-measurement frequency at each approach distance depends on the pre-stored setting.

A function of the operation controller 350 may help to set the reference when the noise reference is not set. That is, the operation controller 350 periodically measures noise for a set time or a set period for the location to be detected or the target to be detected which is mapped to the map information and transmits the measured result to the ground control center 3 (for example, the set time or the set period may be set to be 24 hours, 3 days, and the like). The ground control center 3 may analyze a noise generation pattern and set the analyzed noise generation pattern as a noise reference in a normal noise state for the corresponding location to be detected or target to be detected and may reflect the set noise reference to the map information. The so made noise reference and map information are transmitted to the intelligent noise monitoring device 1 and thus may be used as the reference for the abnormal noise determination.

The recharge controller 370 receives information on a state of recharge from the power supply unit 130 of the moving module 100 in real time to check a recharge timing in real time and transmits a signal to the path controller 310 when the state of recharge is a predetermined level or less to allow the intelligent noise monitoring device 1 to move to the recharge station 5. The recharge controller 370 checks the state of recharge while the intelligent noise monitoring device 1 is recharged in the recharge station 5 and when the recharge is completed, transmits a signal to the path controller 310 again to enable the intelligent noise monitoring device 1 to move to the set path again.

The setting controller 390 communicates with the ground control center 3 through the communication module 400 to check whether to change the map information on the location to be detected, whether to update various kinds of set matters, and whether there are change matters such as the set path information. The setting controller 390 receives the update data from the ground control center 3 to reflect the changed contents to the path controller 310, the operation controller 350, the recharge controller 370, or the like when there are the update data changed or updated among the foregoing items.

The communication module 400 has a function of communicating with the ground control center 3, the recharge station 5, and another intelligent noise monitoring device 1' which is driving. The communication module 400 may include the GPS receiving module 410 and discriminates a flying position of the intelligent noise monitoring device 1 using the GPS receiving module 410 to map the discriminated flying position to the map information and transmits the corresponding information to the path controller 310. The intelligent noise monitoring device 1 may use the GPS receiving module 410 to determine at which location on the map the current flying position is positioned. The ground control center 3 estimates the position of the target to be detected within the location to be detected based on the position of the intelligent noise monitoring device 1. For example, when the intelligent noise monitoring device 1 approaches the target to be detected, the GPS coordinate value of the intelligent noise monitoring device 1 at the corresponding position is mapped to the map information and therefore the corresponding GPS coordinate value corresponds to the position of the target to be detected by the intelligent noise monitoring device 1. The positional information is mapped to the map information for each target to be detected and therefore the ground control center 3 may estimate the positional information of the target to be detected based on the corresponding map information. That is, the positional information of the target to be detected is calculated based on the positional information of the intelligent noise monitoring device 1.

Further, the intelligent noise monitoring device 1 may map the position of the targets where noise occurs to the information of the GPS receiving module 410 at the time of the initial operation in the location where there is no map and therefore may help to prepare the map.

Further, the communication module 400 senses the positions of the recharge stations 5 nearest to each position of the intelligent noise monitoring devices 1 in real time and also senses positions of other intelligent noise monitoring devices 1', which are driving at the surroundings, in real time and transmits the sensed positions to the path controller 310. The positions of the recharge station 5 and another intelligent noise monitoring device 1' are transmitted to the path controller 310 through the communication module 400 and the path controller 310 reflects the transmitted data to the path change.

Meanwhile, since the foregoing intelligent noise monitoring device 1 includes a battery having a defined state of charge and needs to keep the flying state for a predetermined time within the location to be detected, when the location to be detected is excessively wide or the flying time is a predetermined time or more, only one intelligent noise monitoring device 1 has difficulty of covering the whole location to be detected. Therefore, to supplement these aspects, it is preferable to operate the plurality of intelligent noise monitoring devices 1 and 1'.

When the plurality of intelligent noise monitoring devices 1 and 1' are operated, the location to be detected is partitioned at a predetermined size and thus each of the intelligent noise monitoring device 1 and 1' takes wholly charge of one location. Further, when each of the intelligent noise monitoring devices 1 and 1' reaches the recharge timing before the noise measurement is completed and thus directs to the recharge station 5, a signal is transmitted to the intelligent noise monitoring devices 1 which are positioned around or nearest to the border of the partitioned location and thus another intelligent noise monitoring device 1' may instead perform the noise measurement. After being recharged, the corresponding noise monitoring device returns to an original path and the ground control center 3 reflects the noise and the path information measured by the noise monitoring device which substitutes for the noise measurement to the recharged noise monitoring device. The recharged noise monitoring device may receive a path other than a location where the noise measurement is completed in advance to measure noise. The noise monitoring device which substitutes for the noise measurement has an original location of responsibility and therefore does not cover the whole location to be detected of another noise monitoring device but measures noise by setting only the target to be detected around the border of a location different from the original location of responsibility as a target. This is to allow the noise monitoring device to perform the operation without deviating from the original path if possible and to return to an original path. An area or a size of a location which is instead subjected to the noise measurement are set in advance for each location to be detected and thus are stored in each of the intelligent noise monitoring devices 1 and 1'.

According to the foregoing exemplary embodiment of the present invention, the control module is configured of a plurality of controllers, which is a conceptual division depending on a control flow within the control module and therefore does not necessarily include each configuration and one controller may control all the components.

In the intelligent noise monitoring device according to the exemplary embodiment of the present invention having the above configuration, a method for allowing the intelligent noise monitoring device applying for the location to be detected to measure noise will be described below.

Figure 3:
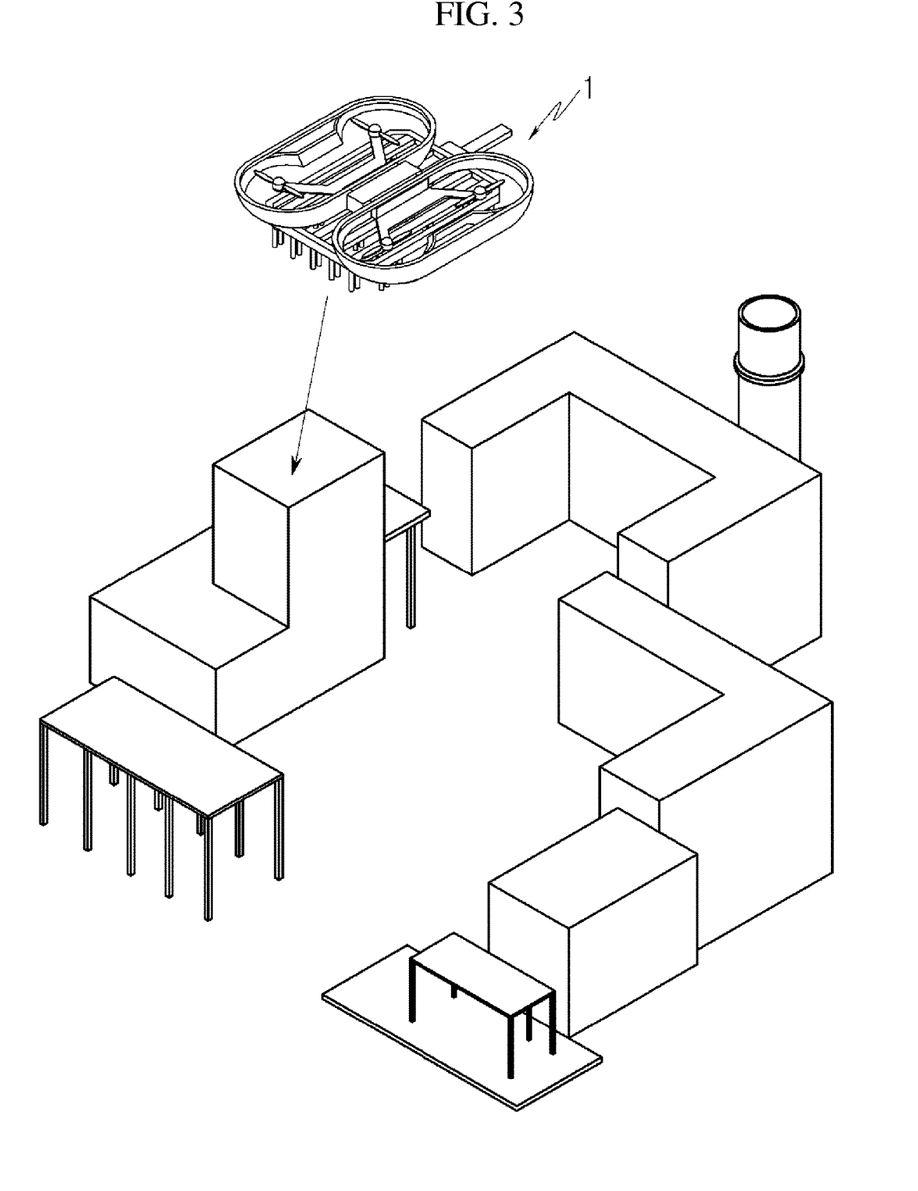
FIG. 3 is a perspective view illustrating an operation example of the intelligent noise monitoring device according to the exemplary embodiment of the present invention.
Figure 4:
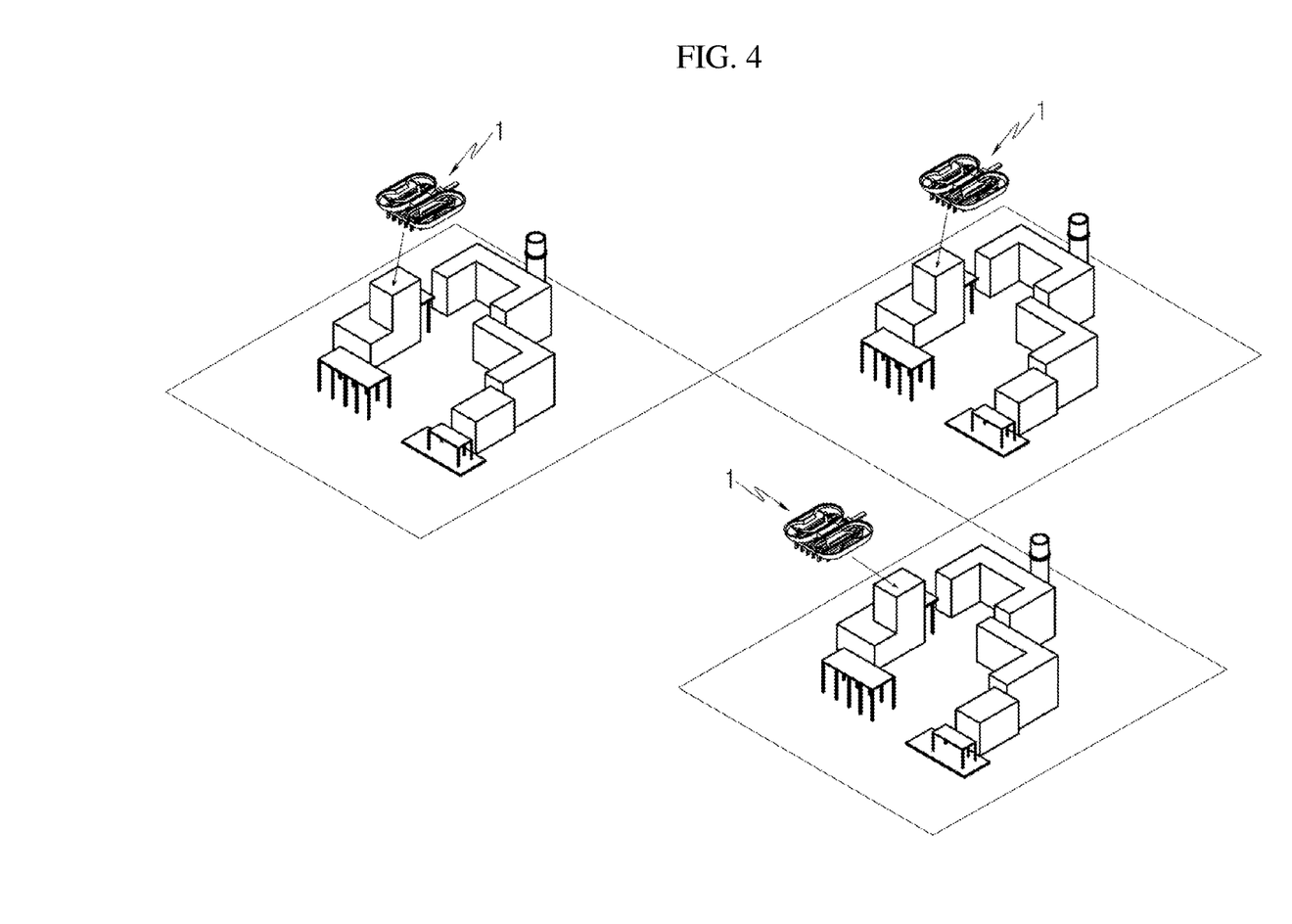
FIG. 4 is a perspective view illustrating an operation example of the intelligent noise monitoring device according to an exemplary embodiment.
Figure 5:
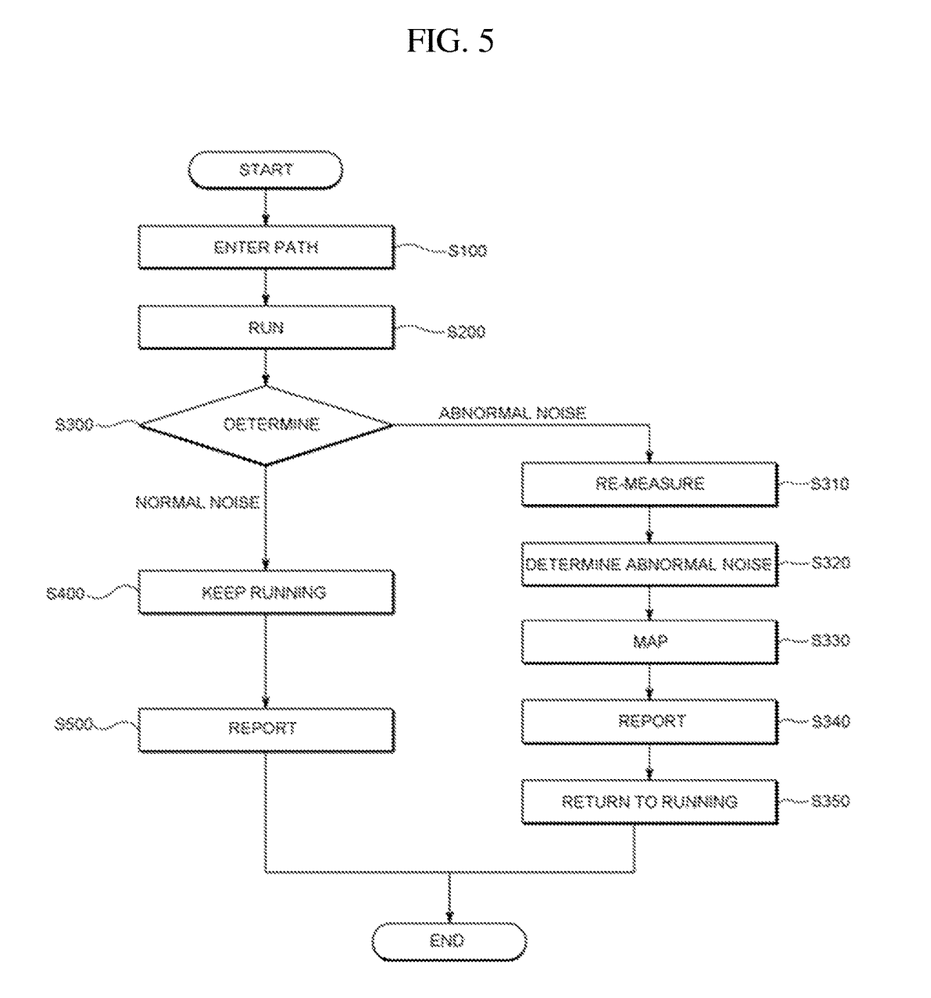
FIG. 5 is a flow chart illustrating a noise monitoring method of an intelligent noise monitoring device according to an exemplary embodiment of the present invention.

FIG. 3 and FIG. 4 are perspective views illustrating an operation example of the intelligent noise monitoring device according to the exemplary embodiments of the present invention and FIG. 5 is a flow chart illustrating a noise monitoring method of an intelligent noise monitoring device carried out by the controller according to an exemplary embodiment of the present invention.

As illustrated in FIGS. 3 and 4, the intelligent noise monitoring device 1 according to the exemplary embodiment of the present invention flies to the location to be detected which is stored in the path controller 310 in advance and measures the noise of the target to be detected.

As illustrated in FIG. 5, first, the intelligent noise monitoring device 1 enters the location to be detected along the stored path (entering a path, S100) and runs along the set path to measure the noise of the target to be detected which is mapped to the map information (flying, S200). The measured noise is compared with the reference (determining, S300) and when the noise is noise in the normal range, the intelligent noise monitoring device 1 moves to the subsequent target to be detected (keeping running, S400). When the noise measurement operation is completed by the process, the intelligent noise monitoring device 1 transmits the noise and the map information which are measured by communicating with the ground control center 3 (reporting, S500).

When the noise measured in the determining step (S300) is not the noise in the normal range or is different from the stored frequency or the noise pattern, the noise is determined as the abnormal noise. If it is determined that the noise is determined as the abnormal noise, the intelligent noise monitoring device 1 more approaches the noise generation target to re-measure noise and divides a distance up to the noise generation target in each step to perform the re-measurement plural times (re-measuring, S310). The intelligent noise monitoring device 1 gradually approaches the noise generation target to measure noise and then analyzes the measured result to determine whether the noise is the abnormal noise (determining the abnormal noise, S320) and if it is determined that the noise is the abnormal noise, the intelligent noise monitoring device 1 maps the GPS coordinate value of the intelligent noise monitoring device 1 at the corresponding position to the map information (mapping, S330) and transmits the noise and the map information measured by communicating with the ground control center 3 (reporting, S340). After communicating with the ground control center 3, the intelligent noise monitoring device 1 moves the subsequent target to be detected (returning running, S340).

When obstacles suddenly occur on the set path while the intelligent noise monitoring device 1 flies, the intelligent noise monitoring device 1 compares the obstacles with the stored map information to reflect the positions of the obstacles to the map information and transmit the changed map information to the ground control center 3.

Further, the intelligent noise monitoring device 1 deviates from the set path to enter the corresponding noise measurement location when receiving a request from another intelligent noise monitoring device 1' while the intelligent noise monitoring device 1 flies around the border adjacent to the location to be detected of another intelligent noise monitoring device 1'. Alternatively, even though no request of another intelligent noise monitoring device 1' is present, when the noise occurs around the border and even when the intelligent noise monitoring device 1 which takes charge of the corresponding location is not sensed, the intelligent noise monitoring device 1 may move to the corresponding location through the communication with the ground control sensor 3. The map information on the corresponding noise measurement location may also be stored in advance at the time of the initial setting of the intelligent noise monitoring device 1 and may also be received from another intelligent noise monitoring device 1' which issues the request. After the noise of the target to be detected is measured along the changed path, another intelligent noise monitoring device 1' returns or when the noise measurement of the border is completed, the intelligent noise monitoring device 1 transmits the noise measured by the ground control center 3 and then returns to the originally set path.

The intelligent noise monitoring device 1 measures all noises of the target to be detected within the location to be detected and then returns to the recharge station or resumes the operation of measuring the noise to be detected along the set path again when the state of charge is sufficient and the set measurement period returns.

According to the exemplary embodiments of the present invention, the intelligent noise monitoring device and the noise monitoring method using the same may self-move the wide targeted location using the self-movable moving module so as to sense the noise of the targeted location or the target to be measured in real time and may compare and analyze the sensed noise with the reference value to sense and determine whether the abnormal noise occurs in the targeted location in real time. Therefore, it is possible to simplify the noise measurement operation and improve the operation efficiency without the user directly performing the measurement operation.

Further, according to the exemplary embodiments of the present invention, the intelligent noise monitoring device and the noise monitoring method using the same may automatically self-move using the moving module to collect the noise data of the targeted location, and as a result, may apply for the operations of preparing the map about the noise occurrence, and the like, to have the high utilization.

The exemplary embodiment of the present invention, which is described as above and shown in the drawings, should not be interpreted as limiting the technical spirit of the present invention. The scope of the present invention is limited only by matters set forth in the claims and those skilled in the art can modify and change the technical subjects of the present invention in various forms. Therefore, as long as these improvements and changes are apparent to those skilled in the art, they are included in the protective scope of the present invention.

What is claimed is:

1. An intelligent noise monitoring device, comprising:
 a self-movable moving module including a noise measurement module, a control module and a communication module,
 the intelligent noise monitoring device configured to
 set up a target area or a target location in order to monitor a noise level thereof, based on a predetermined noise reference level,
 operate the self-movable moving module to measure the noise level of the target area or the target location by flying along the target area or the target location, and
 generate, when the noise is detected from the target area or the target location, map information for positioning the target area and the target location on a map based on the measured noise level and the detected noise and the predetermined noise reference level, wherein the noise measurement module, the control module and the communication module are disposed in the self-movable moving module;

wherein the noise measurement module is configured to measure the noise level of the target area or the target location, or a target which is positioned within the target area or the target location, wherein the self-movable moving module is configured to move with respect to the location;

wherein the control module is configured to control the moving module and the noise measurement module and to obtain a value of the predetermined noise reference level by periodically measuring the noise level of the target area or the target location or the target at a set time or for a set period, and store the value of the predetermined noise reference level as a noise level reference of the target area or the target location or the target in a normal noise state; and wherein the communication module is configured to communicate with a ground control center, wherein the control module is further configured to:
compare a later measured noise level from the target area or the target location or the target with the predetermined noise reference level to determine whether or not the later measured noise level is in an abnormal state and transmit the determination to the ground control center when the abnormal state is determined through the communication module.

2. The intelligent noise monitoring device of claim 1, wherein the moving module includes a self-flying unmanned aerial means and the noise measurement module includes an acoustic camera.

3. The intelligent noise monitoring device of claim 1, wherein the control module includes a path controller configured to control a path of the moving module, a noise measurement controller configured to control the noise measurement module, an operation controller configured to analyze the noise level measured by the noise measurement module to determine the abnormal state or not, a recharge controller configured to control recharge and power of the moving module, and a setting controller configured to manage preset data and update data received from the ground control center.

4. The intelligent noise monitoring device of claim 3, wherein the noise measurement controller operates the noise measurement module when entering the target area or the target location and stops the noise measurement module at the time of deviating from the location after the noise measurement operation is completed.

5. The intelligent noise monitoring device of claim 3, wherein the recharge controller checks a state of charge or a charging timing of the moving module and controls the moving module to move to a recharge station depending on a state of charge or the charging timing.

6. The intelligent noise monitoring device of claim 5, wherein the communication module includes a global positioning system (GPS) receiving module, discriminates GPS coordinates within the target area or the target location by the GPS receiving module and maps the discriminated GPS coordinates to the map information, and transmits the mapped information to the path controller.

7. The intelligent noise monitoring device of claim 3, wherein the setting controller communicates with the ground control center through the communication module to determine whether the update data is set including any one of whether to change the map information, whether to update the preset data, or whether to change the set path so as to receive the update data and reflect the received update data to the preset data.

8. The intelligent noise monitoring device of claim 1, wherein the control module stores the map information of the target area or the target location, positional information within the target area or the target location which is mapped to the map information and mapped to the value of the predetermined noise reference level for the target area or the target location, and a set path along which the moving module moves and when the map information and the set path are changed, stores and updates the changed map information and set path.

9. The intelligent noise monitoring device of claim 8, wherein the control module stores a changed path when the set path is changed for any one of avoidance of obstacles on the path, emergency recharging, or noise measurement of a border of the location, and compares the changed path with the set path to control a return to the set path.

10. The intelligent noise monitoring device of claim 1, wherein the operation controller transmits a signal to the noise measurement controller, upon determining that the noise level is the abnormal noise, to re-measure the noise level of the target area or the target location or the target at each distance.

11. The intelligent noise monitoring device of claim 1, wherein the noise level and the predetermined noise reference level include a form of any one of a decibel (dB), a frequency, or a noise pattern.

12. A noise monitoring method, comprising:
setting up a target area or a target location in order to monitor a noise level thereof, based on a predetermined noise reference level;

operating the self-movable moving module to measure the noise level of the target area or the target location by flying along the target area or the target location; and generating, when the noise is detected from the target area or the target location, map information for positioning the target area and the target location on a map based on the measured noise level and the detected noise and the predetermined noise reference level, wherein the noise monitoring method further comprises:
controlling a noise monitoring device to enter a target area or a target location, by a driving of a moving module self-moving along a set path stored in a control module of the noise monitoring device that controls the moving module and a noise measurement module, wherein the noise measurement module the control module and a communication module are disposed in the moving module;

measuring, by the noise measurement module equipped in the moving module, noise level of the target area or the target location or a target disposed in the target area or the target location while moving along the set path, wherein the moving module is configured to move with respect to the target area or the target location;

creating, by the control module disposed in the moving module, a predetermined noise reference level of the target area or the target location or the target in a normal noise state by periodically measuring the noise level of the target area or the target location or the target for a set time or a set period;

comparing, by the control module, the predetermined noise reference with a later measured noise level to determine whether the measured noise level is in an abnormal noise state or a normal noise state;

transmitting the determination to the ground control center when the abnormal state is determined; and controlling a movement of the noise monitoring device by the control module based upon whether the noise level is in the normal noise state or the abnormal noise state.

13. The noise monitoring method of claim 12, further comprising:

based upon the noise level being in the abnormal noise state, re-measuring the noise level of the target at each distance and a determining whether the noise level measured in there-measuring step is the abnormal noise state.

14. The noise monitoring method of claim 13, further comprising:

based upon the noise level being in the abnormal noise state, mapping positional information of the noise monitoring device to map information of the target area or the target location by the communication module, after the mapping step, transmitting the noise and the map information which are measured by communicating with the ground control center by the communication module, and after the transmitting step, returning to the set path by the intelligent noise monitoring device.

15. The noise monitoring method of claim 12, further comprising:

after controlling the movement of the noise monitoring device based upon the measured noise, transmitting the measured noise level to the ground control center.

16. The noise monitoring method of claim 12, wherein the noise and the predetermined noise reference level in the normal noise state include a form of any one of a decibel (dB), a frequency, or a noise pattern.

17. An intelligent noise monitoring device, the intelligent noise monitoring device configured to:

set up a target area or a target location in order to monitor a noise level thereof, based on a predetermined noise reference level, operate a self-movable moving module to measure the noise level of the target area or the target location by flying along the target area or the target location, and generate, when the noise is detected from the target area or the target location, map information for positioning the target area and the target location on a map based on the measured noise level and the detected noise and the predetermined noise reference level, wherein the intelligent noise monitoring device comprises:

the self-movable moving module;

a noise measurement module provided in the moving module configured to measure noise level of a target area or a target location or a target which is positioned within the target area or the target location, wherein the self-movable moving module is configured to move with respect to the target area or the target location;

a control module provided in the moving module and programmed to:

control the moving module and the noise measurement module;

communicate with a ground control center, predetermine a noise reference level by periodically measuring the noise level of the target area or the target location or the target at a predetermined time or a predetermined period of time, store the predetermined noise reference level, compare the measured noise level from the target area or the target location or the target with the predetermined noise reference level in order to determine whether or not the measured noise level is in an abnormal state, based upon an abnormal state being determined, transmit the measured noise level to a ground control center.

* * * * *